United States Patent
Lo et al.

(10) Patent No.: US 9,286,520 B1
(45) Date of Patent: Mar. 15, 2016

(54) REAL-TIME ROAD FLARE DETECTION USING TEMPLATES AND APPROPRIATE COLOR SPACES

(71) Applicant: Google Inc., Mountain View, CA (US)

(72) Inventors: Wan-Yen Lo, Zurich (CH); David Ian Franklin Ferguson, San Francisco, CA (US); Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 13/942,747

(22) Filed: Jul. 16, 2013

(51) Int. Cl.
  *H04N 7/00* (2011.01)
  *G06K 9/00* (2006.01)

(52) U.S. Cl.
  CPC .................. *G06K 9/00791* (2013.01)

(58) Field of Classification Search
  USPC .......................................................... 348/113
  See application file for complete search history.

(56) References Cited

U.S. PATENT DOCUMENTS

| | | | |
|---|---|---|---|
| 5,153,722 | A | 10/1992 | Goedeke et al. |
| 8,139,109 | B2 | 3/2012 | Schmiedel et al. |
| 8,340,438 | B2 | 12/2012 | Anderson |
| 8,358,812 | B2 * | 1/2013 | Free .................. G06K 9/00234 382/118 |
| 2007/0291130 | A1 | 12/2007 | Broggi et al. |
| 2009/0102859 | A1 * | 4/2009 | Athsani .................. G06F 3/011 345/619 |
| 2009/0295917 | A1 * | 12/2009 | Zhang ................ G06K 9/00798 348/119 |
| 2010/0013615 | A1 | 1/2010 | Hebert et al. |
| 2012/0035788 | A1 | 2/2012 | Trepagnier et al. |
| 2012/0101680 | A1 | 4/2012 | Trepagnier et al. |
| 2012/0148148 | A1 | 6/2012 | Ko et al. |
| 2013/0058542 | A1 | 3/2013 | Stubler et al. |
| 2013/0058577 | A1 | 3/2013 | Stubler et al. |
| 2013/0058583 | A1 | 3/2013 | Gallagher et al. |

FOREIGN PATENT DOCUMENTS

WO  WO 2007/113428 A1  10/2007

OTHER PUBLICATIONS

Non-Final Office Action issued in Co-Pending U.S. Appl. No. 13/603,609, U.S. Patent and Trademark Office, dated Feb. 9, 2015, 18 pgs.

* cited by examiner

*Primary Examiner* — Dave Czekaj
*Assistant Examiner* — Leron Beck
(74) *Attorney, Agent, or Firm* — McDonnell Boehnen Hulbert & Berghoff LLP

(57) ABSTRACT

Methods and systems for real-time road flare detection using templates and appropriate color spaces are described. A computing device of a vehicle may be configured to receive an image of an environment of the vehicle. The computing device may be configured to identify a given pixels in the plurality of pixels having one or more of: (i) a red color value greater than a green color value, and (ii) the red color value greater than a blue color value. Further, the computing device may be configured to make a comparison between one or more characteristics of a shape of an object represented by the given pixels in the image and corresponding one or more characteristics of a predetermined shape of a road flare; and determine a likelihood that the object represents the road flare.

17 Claims, 10 Drawing Sheets

COMPUTER PROGRAM PRODUCT 700

SIGNAL BEARING MEDIUM 701

PROGRAM INSTRUCTIONS 702

- RECEIVING, AT A COMPUTING DEVICE OF A VEHICLE, AN IMAGE OF AN ENVIRONMENT OF THE VEHICLE, WHERE THE IMAGE INCLUDES A PLURALITY OF PIXELS HAVING RESPECTIVE RED COLOR VALUES, GREEN COLOR VALUES, AND BLUE COLOR VALUES

- IDENTIFYING GIVEN PIXELS IN THE PLURALITY OF PIXELS HAVING ONE OR MORE OF: (I) A RED COLOR VALUE GREATER THAN A GREEN COLOR VALUE, AND (II) THE RED COLOR VALUE GREATER THAN A BLUE COLOR VALUE

- MAKING A COMPARISON BETWEEN ONE OR MORE CHARACTERISTICS OF A SHAPE OF AN OBJECT REPRESENTED BY THE GIVEN PIXELS IN THE IMAGE AND CORRESPONDING ONE OR MORE CHARACTERISTICS OF A PREDETERMINED SHAPE OF A ROAD FLARE

- DETERMINING, USING THE COMPUTING DEVICE, A LIKELIHOOD THAT THE OBJECT REPRESENTS THE ROAD FLARE

- MODIFYING, USING THE COMPUTING DEVICE, A CONTROL STRATEGY ASSOCIATED WITH A DRIVING BEHAVIOR OF THE VEHICLE, BASED ON THE LIKELIHOOD

- CONTROLLING, USING THE COMPUTING DEVICE, THE VEHICLE BASED ON THE MODIFIED CONTROL STRATEGY

| COMPUTER READABLE MEDIUM 703 | COMPUTER RECORDABLE MEDIUM 704 | COMMUNICATIONS MEDIUM 705 |

FIGURE 7

REAL-TIME ROAD FLARE DETECTION USING TEMPLATES AND APPROPRIATE COLOR SPACES

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure describes embodiments that relate to real-time road flare detection using templates and appropriate color spaces. In one aspect, the present disclosure describes a method. The method comprises receiving, at a computing device of a vehicle, an image of an environment of the vehicle, where the image includes a plurality of pixels having respective red color values, green color values, and blue color values. The method also comprises identifying given pixels in the plurality of pixels having one or more of: (i) a red color value greater than a green color value, and (ii) the red color value greater than a blue color value. The method further comprises making a comparison between one or more characteristics of a shape of an object represented by the given pixels in the image and corresponding one or more characteristics of a predetermined shape of a road flare. The method also comprises determining, using the computing device, a likelihood that the object represents the road flare. The method further comprises modifying, using the computing device, a control strategy associated with a driving behavior of the vehicle, based on the likelihood; and providing, using the computing device, instructions to control the vehicle based on the modified control strategy.

In another aspect, the present disclosure describes a non-transitory computer readable medium having stored thereon instructions that, when executed by a computing device of a vehicle, cause the computing device to perform functions. The functions comprise receiving an image of an environment of the vehicle, where the image includes a plurality of pixels having respective red color values, green color values, and blue color values. The functions also comprise identifying given pixels in the plurality of pixels having one or more of: (i) a red color value greater than a green color value, and (ii) the red color value greater than a blue color value; and making a comparison between one or more characteristics of a shape of an object represented by the given pixels in the image and corresponding one or more characteristics of a predetermined shape of a road flare. The functions further comprise determining a likelihood that the object represents the road flare. The functions also comprise modifying a control strategy associated with a driving behavior of the vehicle, based on the likelihood; and providing instructions to control the vehicle based on the modified control strategy.

In still another aspect, the present disclosure describes a system. The system comprises at least one processor; and data storage comprising instructions that, when executed by the at least one processor, cause the system to perform functions. The functions comprise receiving an image of an environment of a vehicle, where the image includes a plurality of pixels having respective red color values, green color values, and blue color values. The functions further comprise identifying given pixels in the plurality of pixels having one or more of: (i) a red color value greater than a green color value, and (ii) the red color value greater than a blue color value; and making a comparison between one or more characteristics of a shape of an object represented by the given pixels in the image and corresponding one or more characteristics of a predetermined shape of a road flare. The functions also comprise determining a likelihood that the object represents the road flare. The functions further comprise modifying a control strategy associated with a driving behavior of the vehicle, based on the likelihood; and providing instructions to control the vehicle based on the modified control strategy.

In still another aspect, the present disclosure describes a device. The device comprises a means for receiving an image of an environment of a vehicle, where the image includes a plurality of pixels having respective red color values, green color values, and blue color values. The device also comprises a means for identifying given pixels in the plurality of pixels having one or more of: (i) a red color value greater than a green color value, and (ii) the red color value greater than a blue color value; and a means for making a comparison between one or more characteristics of a shape of an object represented by the given pixels in the image and corresponding one or more characteristics of a predetermined shape of a road flare. The device further comprises a means for determining a likelihood that the object represents the road flare. The device also comprises a means for modifying a control strategy associated with a driving behavior of the vehicle, based on the likelihood; and a means for providing instructions to control the vehicle based on the modified control strategy.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is a schematic illustrating a conceptual partial view of a computer program, in accordance with an example embodiment.

DETAILED DESCRIPTION

Figure 1:
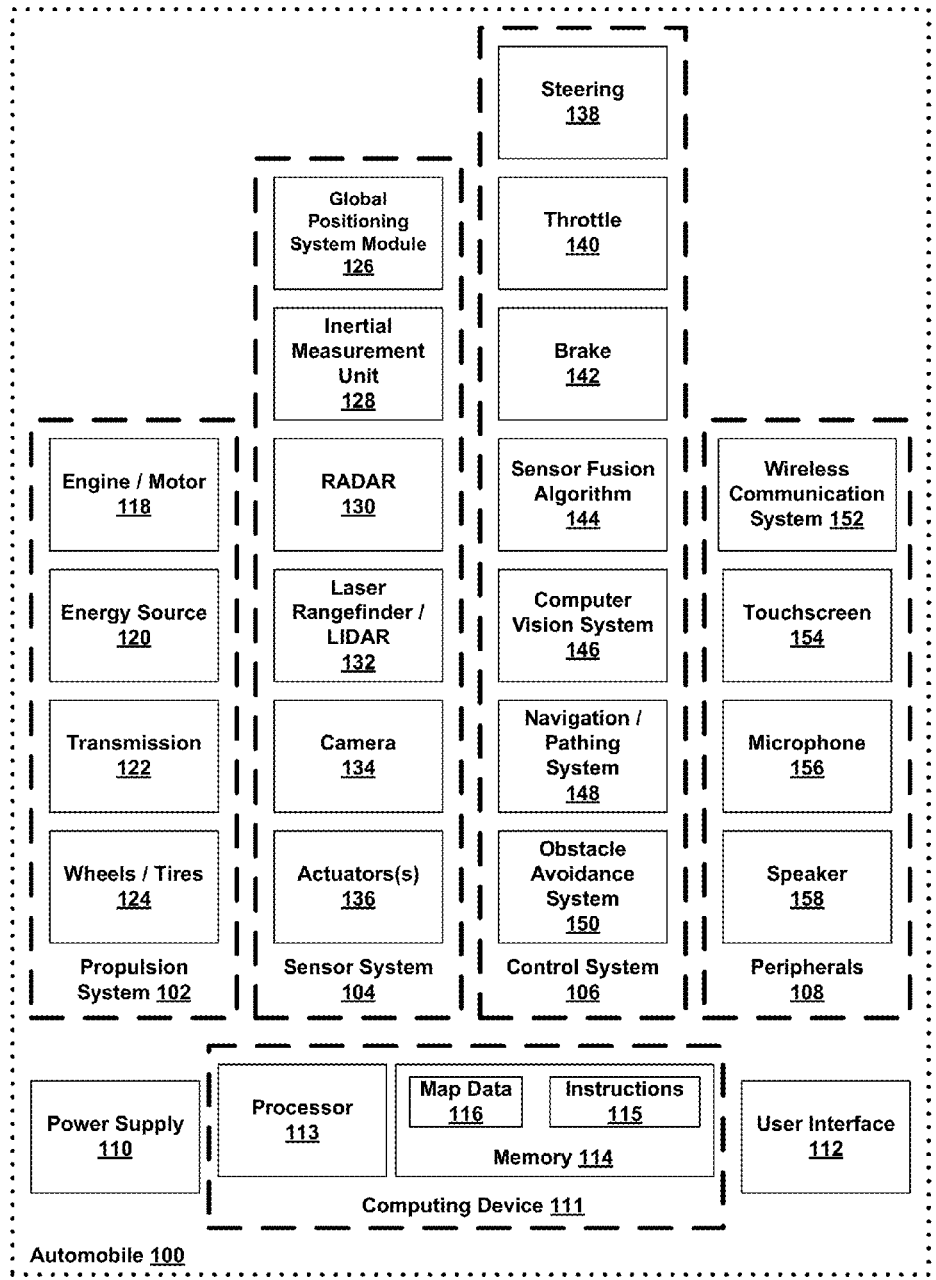
FIG. 1 is a simplified block diagram of an example automobile, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on maps for navigation. In some examples, hazard conditions on the road, such as accident sites or obstacles, may not be included in the maps, but are often identified by road flares. Therefore, the autonomous vehicle may be configured to detect hazard conditions on the road by detecting road flares so as to determine safe navigation trajectories.

A road flare may be a type of pyrotechnic (material capable of undergoing self-contained and self-sustained exothermic chemical reaction) that produces a brilliant light or intense heat without an explosion. Road flares can be used for signaling, illumination, indicating obstacles or advising caution in hazard conditions on roads. Road flares may produce light through combustion of a pyrotechnic composition. Flares may be colored by inclusion of pyrotechnic colorants. In an example, a road flare may burn for 10-60 minutes with a bright red/yellow light.

In an example, a computing device of a vehicle may be configured to receive an image of a road of travel of the vehicle, where the image includes a plurality of pixels. Road flares may exhibit a brilliant red or yellow color as mentioned above. To detect a road flare, the computing device may be configured to make a comparison between respective color values of the plurality of pixels in the image and a predetermined color value of a road flare. For instance, the computing device may be configured to identify a set of pixels having given color values within a color value threshold from the predetermined color value of the road flare.

Additionally, road flares may appear roundish, or have any other predetermined shape, and occupy a relatively small region in space. The computing device may be configured to compare characteristics of a shape of an object represented by the identified set of pixels in the image to corresponding characteristics of a predetermined shape of the road flare to confirm whether the object represents a road flare. Further, the computing device may be configured to assign a likelihood that the object represents a road flare. Based on the likelihood, the computing device may be configured to modify a control strategy associated with a driving behavior of the vehicle; and control the vehicle based on the modified control strategy. For instance, the computing device may be configured to determine a hazard condition or circumstance associated with the road flare; and modify the control strategy based on the condition or circumstance.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/ tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an O2 monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. The light can be any type of electromagnetic waves such as laser. As an example, the LIDAR unit 132 may include a laser source and/or laser scanner configured to emit pulses of laser and a detector configured to receive reflections of the laser. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems are shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
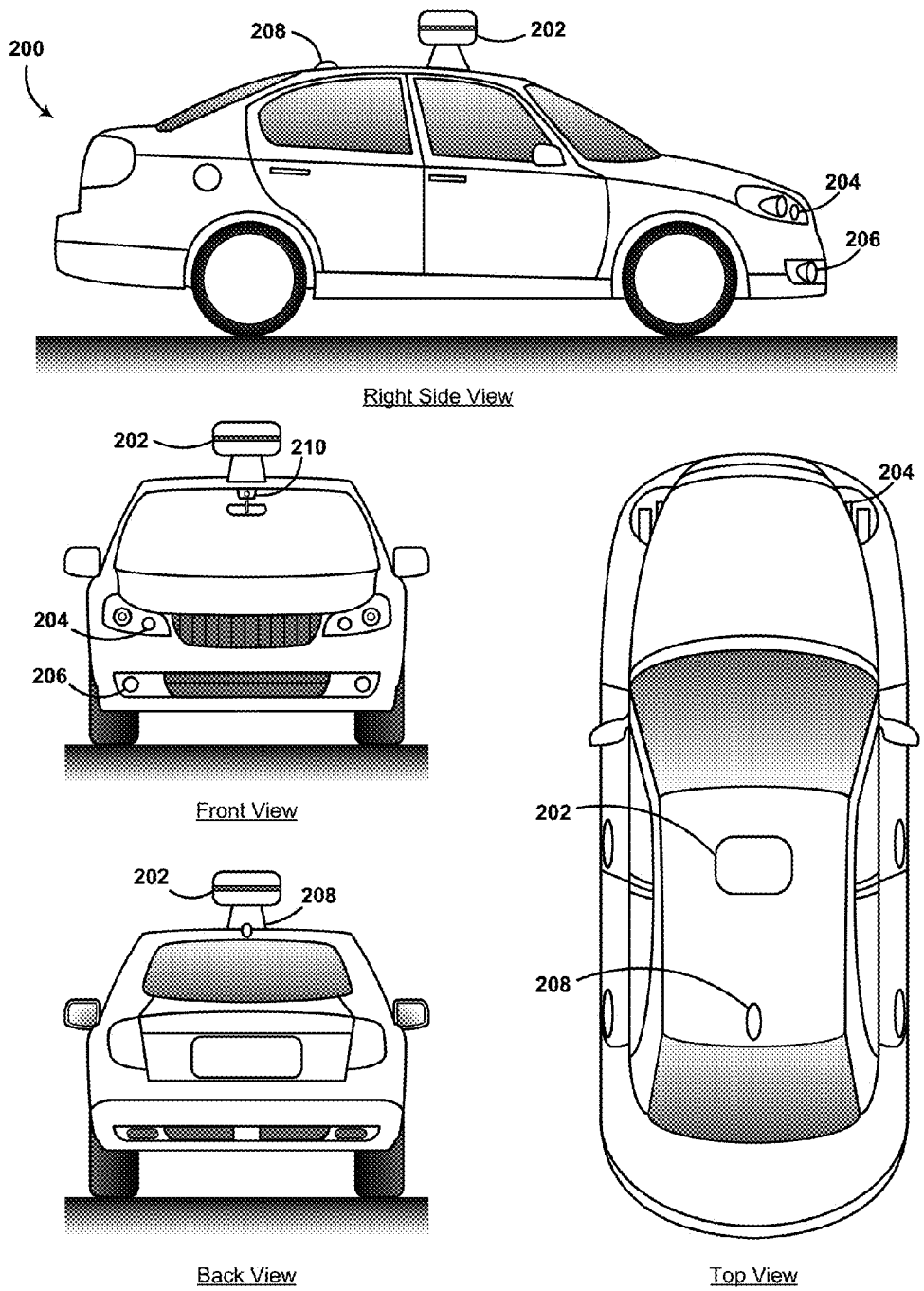
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

As an example, the control system may be configured to detect a hazard condition (e.g., an accident site, spillage of chemicals on a road, etc.) on a road by detecting road flares indicative of the hazard condition, and may be configured to modify the control strategy based on road changes caused by the hazard condition. Use of road flares may be regulated by standard specifications and rules. For instance, an example rule may state that work vehicles should carry a supply of road flares and that the use of flares should be to alert drivers to emergencies and not as routine traffic control device. The standard specifications may direct drivers to be cautious at incident sites where flammable materials, such as fuel spills, are suspected, and to use electronic flares or red/yellow glow sticks. Road flares may be placed on roads, and may be removed when a related incident has terminated.

Figure 3:
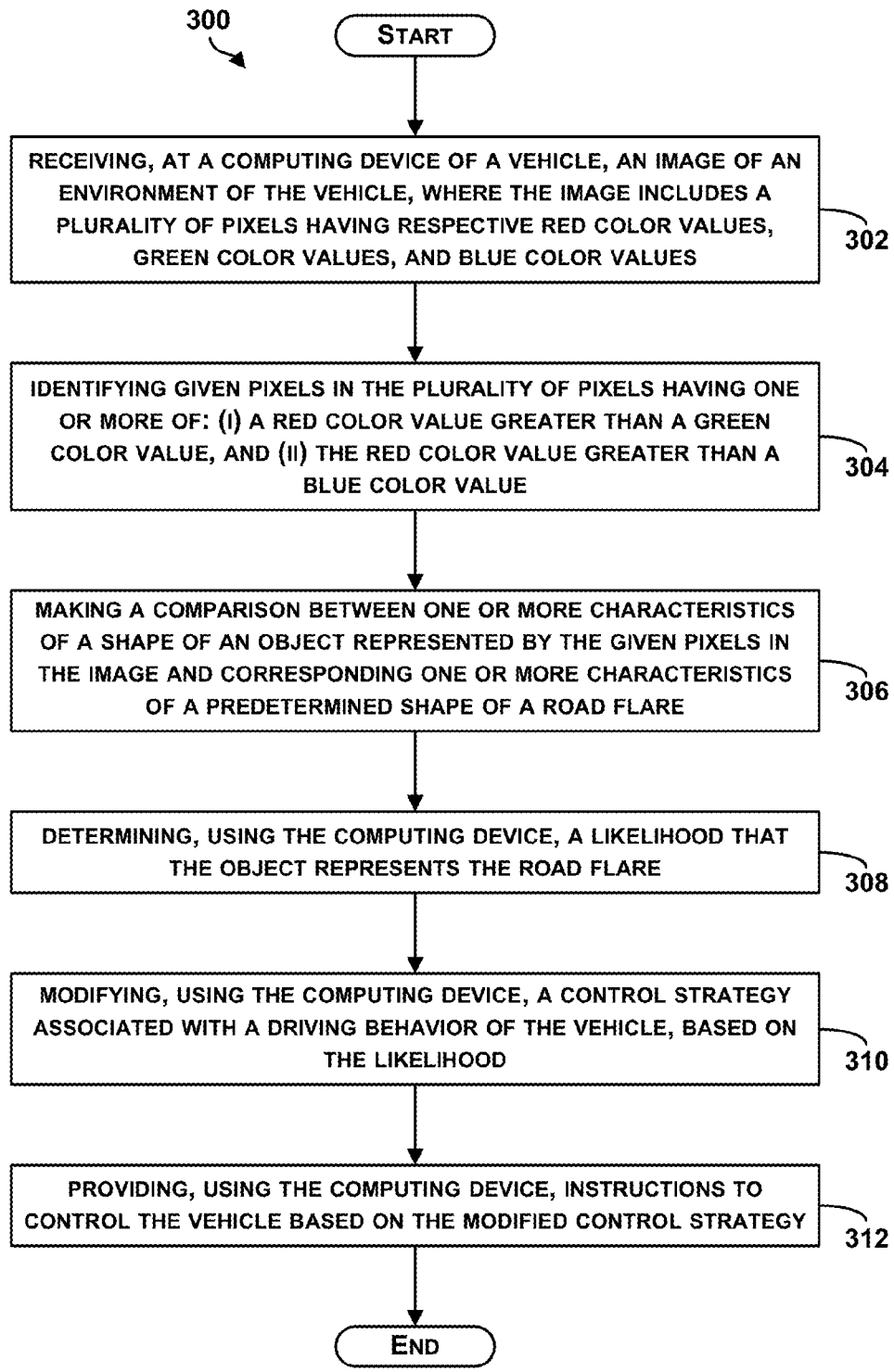
FIG. 3 is a flow chart of a method for real-time road flare detection using templates and appropriate color spaces, in accordance with an example embodiment.

FIG. 3 is a flow chart of a method 300 for real-time road flare detection using templates and appropriate color spaces, in accordance with an example embodiment. The method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device of a vehicle, an image of an environment of the vehicle, where the image includes a plurality of pixels having respective red color values, green color values, and blue color values. The computing device may be onboard the vehicle or may be off-board but in wireless communication with the vehicle, for example. Also, the computing device may be configured to control the vehicle in an autonomous or semi-autonomous operation mode. Also, the computing device may be configured to receive, from sensors coupled to the vehicle, information associated with, for example, condition of systems and subsystems of the vehicle, driving conditions, road conditions, etc. Further, an image-capture device (e.g., the camera 134 in FIG. 1 or the camera 210 in FIG. 2) may be coupled to the vehicle and in communication with the computing device. The image-capture device may be configured to capture images or video of the road and vicinity of the road on which the vehicle is travelling on.

Figure 4:
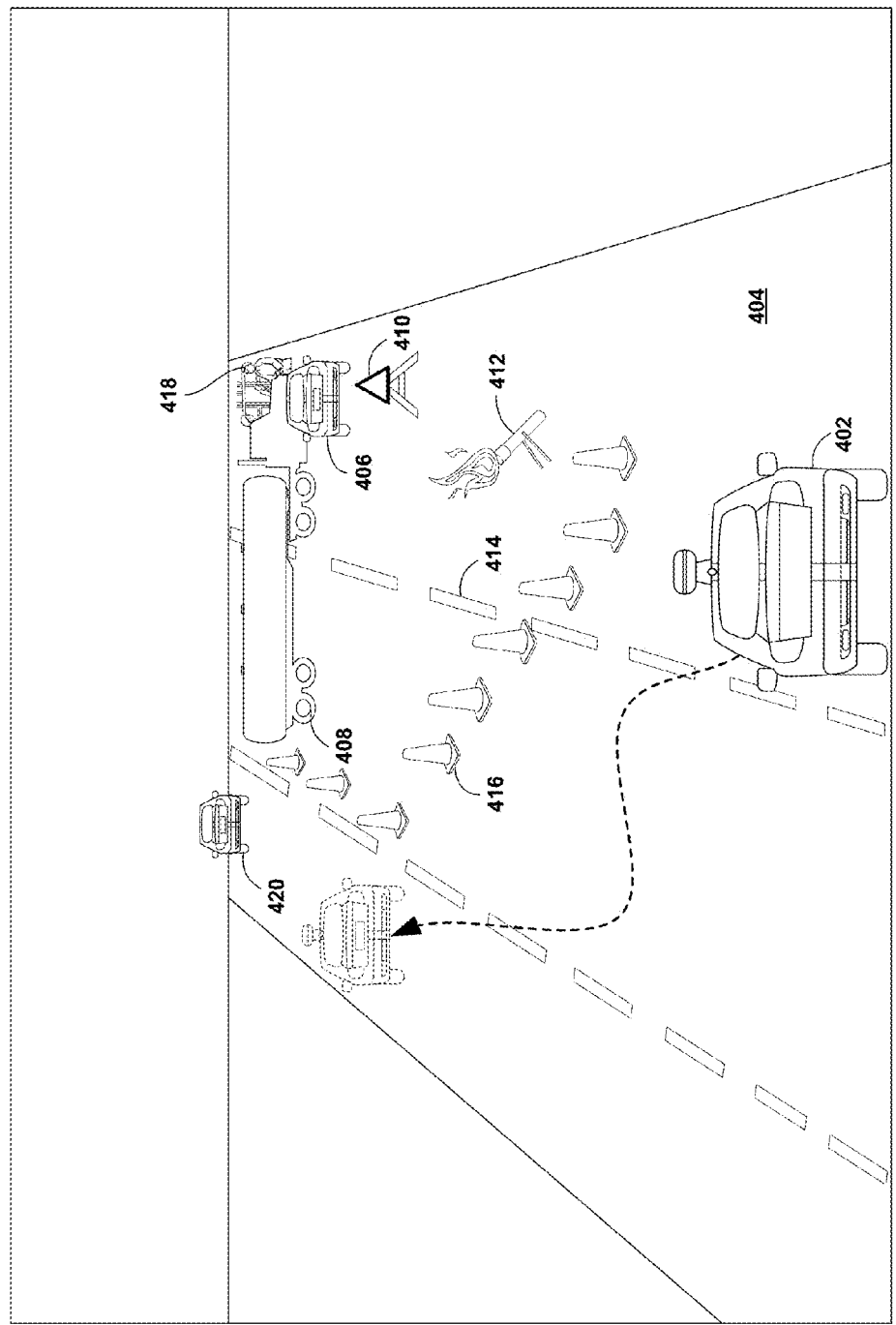
FIG. 4 illustrates a vehicle approaching a hazard condition on a road indicated by a road flare, in accordance with an example embodiment.

FIG. 4 illustrates a vehicle approaching a hazard condition indicated by a road flare, in accordance with an embodiment, to illustrate the method 300. FIG. 4 depicts a vehicle 402 approaching a hazard condition on a road 404. The hazard condition, as shown in FIG. 4, is an accident site where another vehicle 406 collided with a truck 408 as an example. The accident site is used as an example hazard condition for illustration only. Other hazard conditions are possible. The computing device may be configured to detect the hazard condition by detecting a warning sign 410 or by determining whether a bright object 412 represents a road flare indicative of the hazard condition on the road 404.

Figure 5A:
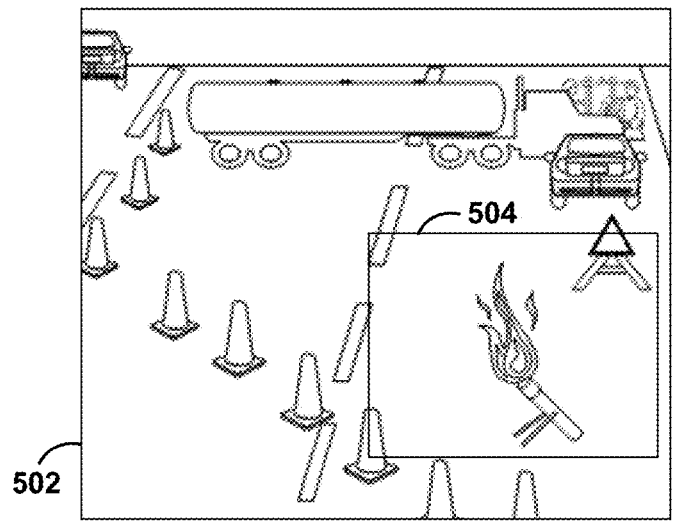
FIG. 5A illustrates an image of a road, in accordance with an example embodiment.

FIG. 5A illustrates an image 502 of the road 404, in accordance with an example embodiment. The image 502 may be captured by an image-capture device coupled to the vehicle 402 in FIG. 4, for example. In an example, the image-capture device may be configured to continuously capture still images or a video from which the still images can be extracted. In one example, one or more image-capture devices may be coupled to the vehicle 402. The one or more image-capture devices may be configured to capture the images from multiple views to take into account surroundings of the vehicle 402 and road condition from multiple directions.

The image 502 includes a plurality of pixels. The image-capture device may be configured to provide to the computing device color information including, for example, red color value, green color value, blue color value for given pixels of the plurality of pixels. In another example, the computing device may be configured to determine such color values upon receiving the image 502. In an example, color information provided by the image-capture device may be represented by a hue-saturation-value (HSV) color space. HSV defines a color space or model in terms of three components: hue, saturation and value. Hue is related to color type (e.g., red, blue, green, yellow). Saturation is related to purity of the color, which is representative of the amount of grey in a color. Value is representative of brightness of color. Brightness relates to an amount of light that appears to be emitted from an object in accordance with visual perception of an observer. A fully saturated color is a vivid pure color, whereas an unsaturated color may have a grey appearance.

In another example, the red, green and blue color value information outputted by the image-capture device can be represented by a hue-saturation-intensity (HIS) color space. In still another example, the color information may be provided as a Red, Green, and Blue (RGB) color space model. The RGB color space includes a model in which all colors may be represented by the additive properties of the primary colors, red, green, and blue. The RGB color space may be represented by a three dimensional cube in which red is the X axis, green is the Y axis, and blue is the Z axis. Different colors are represented within different points within the cube (e.g., white is located at 1,1,1, where X=1, Y=1, and Z=1).

Referring back to FIG. 3, at block 304, the method 300 includes identifying given pixels in the plurality of pixels having one or more of: (i) a red color value greater than a green color value, and (ii) the red color value greater than a blue color value. Road flares may be characterized by an orange color that is between red and yellow. In one example, assuming the image 502 is represented in an RGB color model, the computing device may be configured to compare red value (R) of a given pixel in the image 502 to a threshold red value ($R_{th}$) associated with road flares. If R is sufficiently close to $R_{th}$, (i.e., R is within a predetermined threshold value from $R_{th}$) then the given pixel may represent a road flare. In another example, for a given pixel, the computing device may be configured to subtract green and blue values from the red value, (R-G) and (R-B), and compare result of the subtractions to predetermined values characteristic of road flares.

In still another example, the computing device may be configured to convert the image into a custom-designed monochrome space and filter out regions of the image 502 that do not exhibit color characteristics of road flares. For instance, if (R-G)<0 or (R-B)<0, indicating that the pixel color is neither red nor yellow, the given pixel may be assigned a zero intensity value. Otherwise, the given pixel is red/yellow, and may be assigned an intensity value that is equal to maximum of (R-G) and (R-B), or any other function of (R-G) and (R-B). In this manner, the image 502 is represented in a custom-designed monochrome that filters out pixels that do not meet a color criterion related to road flares (by assigning these pixels a zero intensity values). Other pixels that meet the color criterion are designated as candidate pixels that might represent a road flare.

Figure 5B:
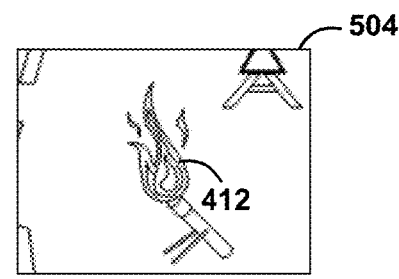
FIG. 5B illustrates a portion of the image of the road depicting an object representing a candidate road flare, in accordance with an example embodiment.

FIG. 5B illustrates a portion of the image of the road depicting an object representing a candidate road flare, in accordance with an example embodiment. The computing device may be configured to limit search space in the image 502 by identifying objects, or sets of pixels representing objects, that meet the color criterion of road flares as described above. For example, the computing device may be configured to limit the search space to image portion 504 that depicts a bright object 412 having a color that meets the color criterion (e.g., R-G>0 or R-B>0 for pixels representing the bright object 412.

Referring back to FIG. 3, at block 306, the method 300 includes making a comparison between one or more characteristics of a shape of an object represented by the given pixels in the image and corresponding one or more characteristics of a predetermined shape of a road flare. Road flares may appear roundish, or have any other predetermined shape, and occupy a relatively small region in space. The computing device may be configured to compare characteristics of a shape of an object represented by the identified given pixels (that meets the color criterion) in the image to corresponding characteristics of a predetermined shape of the road flare to confirm whether the object represents a road flare.

In one example, the computing device may be configured to identify, from objects represented by sets of pixels identified at block 304, objects that appear as roundish (or elliptical or any other shape) blobs. The computing device may efficiently identify such objects using integral image and a template that rejects non-round shapes, for example.

An integral image, also known as a summed area table, represents a data structure and algorithm for quickly and efficiently generating sum of values in a rectangular subset of a grid. Value at any point (x,y) in the summed area table is determined as a sum of pixels (e.g., RGB color value of pixels, intensity of a pixel, or how bright a pixel is, etc.) above and to the left of (x, y):

$$I(x, y) = \sum_{\substack{x' \leq x \\ y' \leq y}} i(x', y') \qquad [1]$$

The summed area table can be computed efficiently in a single pass over an image because the value in the summed area table at (x,y) can be calculated as:

$$I(x,y)=i(x,y)+I(x-1,y)+I(x,y-1)-I(x-1,y-1) \qquad [2]$$

Figure 5C:
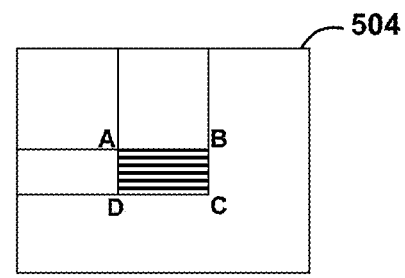
FIG. 5C illustrates determining the sum of a rectangular area for an integral image, in accordance with an example embodiment.

Once the summed area table has been computed, evaluating any rectangle can be accomplished in constant time with four array references. FIG. 5C illustrates determining the sum of a rectangular area for an integral image, in accordance with an example embodiment. Using notations of FIG. 5C, the value can be computed as:

$$\sum_{\substack{A(x)<x' \leq C(x) \\ A(y)<y' \leq C(y)}} i(x', y') = I(C) + I(A) - I(B) - I(D) \qquad [3]$$

Integral image is used as an example for illustration only, and other techniques can be used. An integral image can be determined for the image 502 or the portion 504. Determining the integral image may facilitate applying a template to separate roundish (or any other shape) from non-round objects in the image, for example.

Figure 6A:
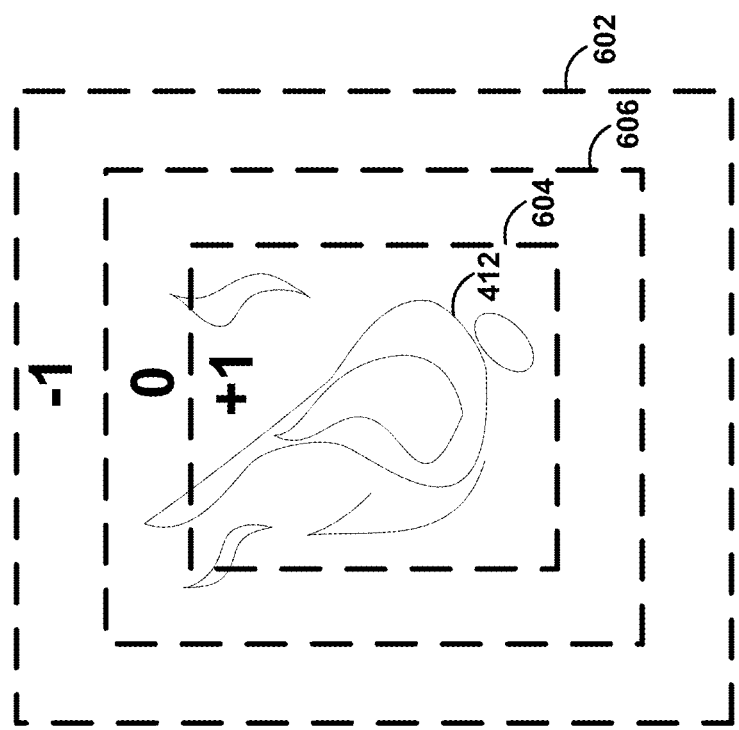
FIG. 6A illustrates applying a template to a portion of an image including a candidate road flare, in accordance with an example embodiment.

FIG. 6A illustrates applying a template to a portion of an image including a candidate road flare, in accordance with an example embodiment. The template illustrated in FIG. 6A includes three rectangles 602, 604, and 606 applied to the bright object 412 (i.e., a candidate road flare). The rectangles 602, 604, and 606 can be applied using a few scales to accommodate different sizes of road flares. The computing device may be configured to determine, using the summed area table of the integral image, a mean value for pixels inside each rectangle or between any two rectangles. For a bright red/yellow roundish (or elliptical or any other shape) blob, such as the bright object 412, a large difference of mean value between pixels inside outer rectangle 602 and pixels inside the inner rectangle 604 may result. For instance, assuming the bright object 412 is a road flare, pixels inside the inner rectangle 604 may have a mean value that is within a threshold color value from a predetermined red/yellow value associated with a road flare. That is indicated by a "+1" value as shown in FIG. 6A. However, pixels between the outer rectangle 602 and middle rectangle 606 may have a mean value that is not within the threshold color value from the predetermined red/yellow value associated with a road flare. These pixels may represent portion of the road or other objects on or proximate to the road, and thus may not have the red/yellow color characteristic of road flares. That is indicated by a "−1" value as shown in FIG. 6A. Pixels between the middle rectangle 606 and the inner rectangle 604 may have a mean value that is somewhere in the middle between the mean value of pixels inside the inner rectangle 604 and the mean value of pixels between the outer rectangle 602 and the middle rectangle 606. That is indicated by a "0" value as shown in FIG. 6A. The pixels between the middle rectangle 606 and the inner rectangle 604 may include pixels that belong to a halo around the road flare. Thus, some of these pixels may have a red/yellow color, and other pixels may represent the road or objects on the road or proximate to the road. The area between the middle rectangle 606 and the inner rectangle 604 may be used to account for variance in sizes of road flares. A bright object, such as the bright object 412, that satisfies the template shown in FIG. 6A is likely a roundish (or elliptical, or any other shape associated with a road flare) blob having a red/yellow color, and is thus likely to be a candidate road flare.

Additionally, to further confirm whether the bright object 412 is a road flare, the computing device may be configured to apply another template. Applying the other template may include sampling of boundaries of the outer rectangle 602 in 8 directions to check if pixels beyond the boundaries have a low mean value indicating a non-red/non-yellow color to ensure that the shape of a candidate object is roundish (or elliptical or any other shape) and occupies a small region in space like road flares. This further confirmation may be computationally expensive and may thus be applied to portions of the image that satisfy the template shown in FIG. 6A.

Figure 6B:
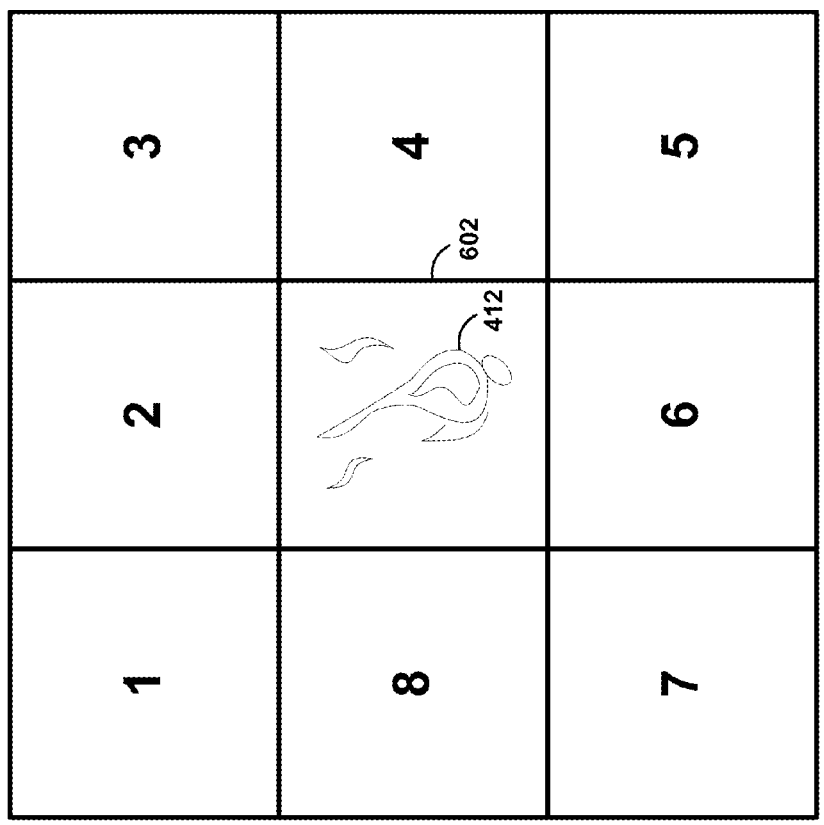
FIG. 6B illustrates applying another template to the portion of the image including the candidate road flare, in accordance with an example embodiment.

FIG. 6B illustrates applying another template to the portion of the image including the candidate road flare, in accordance with an example embodiment. If the bright object 412 represents a road flare, then beyond a boundary of the outer rectangle 602 of FIG. 6A, in all eight directions (represented by regions numbered from 1-8 in the template shown in FIG. 2), pixels may not have color values similar to predetermined color values of the road flare (i.e., may not have red/yellow color). As shown in FIG. 6B, regarding the bright object 412, beyond the boundary of the outer rectangle 602, in all 8 directions, pixels do not have a red/yellow color, and thus there is a high likelihood that the bright object 412 represents a road flare.

Figure 6C:
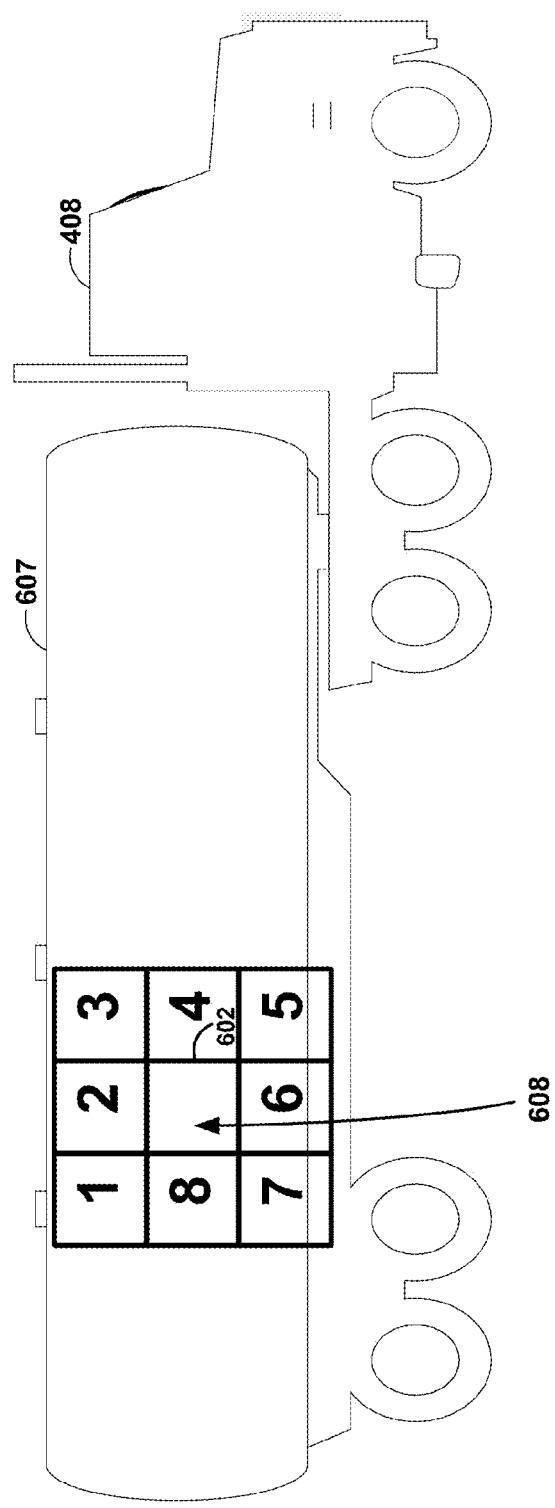
FIG. 6C illustrates using the template of FIG. 6B to identify false candidate road flares, in accordance with an example embodiment.

In this manner, false identifications can be avoided. FIG. 6C illustrates using the template of FIG. 6B to identify false candidate road flares, in accordance with an example embodiment. Assuming that a tank 607 of the truck 408 is red or yellow in color, the computing device may, as described at block 304 of the method 300, identify a set of pixels 608 representing a portion of the tank 607 that satisfies the color criterion (i.e., pixels having a red color value greater than a green color value, or the red color value greater than a blue color value). However, as shown in FIG. 6C, the tank 607 of the truck 408 is large compared to a road flare. In contrast to a set of pixels representing a road flare, when the template described with respect to FIG. 6B is applied to the set of pixels 608, at least some of the regions outside a boundary of the set of pixels will have a red/yellow similar to the color of the set of pixels 608. FIG. 6C depicts that regions 1, 2, 3, 4, and 8, and at least portions of regions 5, 6, and 7 may exhibit color characteristics similar to those of the set of pixels 608 because the regions overlay portions of the tank. Thus, based on applying the template to the set of pixels 608, the computing device may be configured to determine that the set of pixels 608 has a low likelihood of representing a road flare.

Figure 6D:
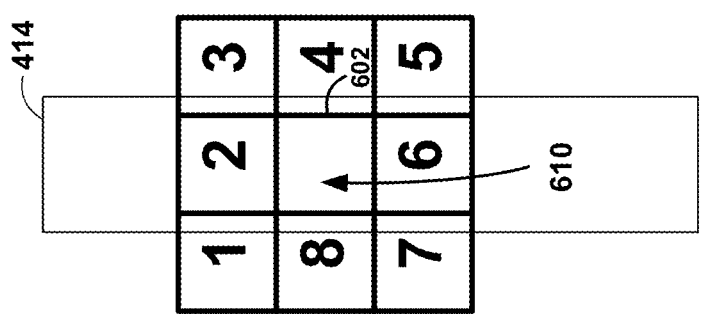
FIG. 6D illustrates using the template of FIG. 6B to identify another false candidate road flares, in accordance with an example embodiment.

Referring back to FIG. 4, lanes on the road 404 may be defined by lane markers such as lane marker 414. In some examples, the lane marker 414 may be yellow in color. FIG. 6D illustrates using the template of FIG. 6B to identify the lane marker 414 as a false candidate road flare, in accordance with an example embodiment. The computing device may identify a set of pixels 610 shown in FIG. 6C that represents a portion of the lane marker 414 and satisfies the color criterion described at block 304 of the method 300. In contrast to a set of pixels representing a road flare, when the template described with respect to FIG. 6B is applied to the set of pixels 610, at least some of the regions outside a boundary of the set of pixels will have a red/yellow similar to the color of the set of pixels 610. FIG. 6D depicts that regions 2 and 6, and at least portions of regions 1, 3, 4, 5, 7, and 8 may exhibit color characteristics similar to those of the set of pixels 610 because the regions overlay portions of the lane marker 414. Based on applying the template to the set of pixels 610, the computing device may be configured to determine that the set of pixels 610 has a low likelihood of representing a road flare.

In addition to comparing color and shape of an object represented by a given set of pixels, the computing device may be configured to identify motion characteristics of the object. Generally, road flares are stationary, because road flares are placed on road surfaces and are not attached to moving objects. Thus, if an object that meets the color criterion and shape template described at blocks 304 and 306 of the method 300, respectively, is found to be stationary, the computing device may be configured to assign a high likelihood that the object represents a road flare. In one example, the computing device may be configured to receive LIDAR-based information or RADAR-based information indicating that the object is stationary and is in an open space as opposed to being a sun reflection from an object attached to a larger moving object, for example, to verify whether the object represents a road flare.

Referring back to FIG. 3, at block 308, the method 300 includes determining, using the computing device, a likelihood that the object represents the road flare. Based on whether a set of pixels meets the color criterion described at block 304, whether a shape of the object represented by the set of pixels satisfy the shape templates described at block 306, and whether the object is moving or stationary, the computing device may be configured to determine a likelihood indicative of a level of certainty or confidence that the object represents a road flare.

In an example, the computing device may be configured to assign a respective likelihood to each characteristic (color, shape, motion, etc.) of an object based on a comparison of that characteristic to a corresponding characteristic of a road flare. As an example, the computing device may be configured to a match metric indicative of how similar that characteristic is to the corresponding characteristic of a road flare (e.g., a percentage of match between that characteristic and the corresponding characteristic of a road flare). The computing device may be configured to determine the respective likelihood based on the match metric. Further the computing device may be configured to determine a single likelihood, based on a combination of the respective likelihoods, indicative of a level of confidence that the object represents a road flare.

For instance, the computing device may be configured to detect a bright object having a red/yellow color and has a shape similar to a shape of a road flare. However, the bright object may be moving, which could indicate that the object might be a chrome part on another vehicle reflecting sun light, for example, and does not represent a road flare. In this example, a first respective likelihood relating to characteristic of color and shape brightness may be high, but a second respective likelihood relating to characteristic of motion may be low. The overall likelihood that this moving object represents a road flare may be low, for example. In some examples, the overall likelihood may be a weighted combination of the respective likelihoods.

In another example, the computing device may be configured to generate a probabilistic model (e.g., a Gaussian distribution), based on characteristics of an identified object, to determine the likelihood that the object represents a road flare. For example, the likelihood that the object represents a road flare may be determined as a function of a set of parameter values that are determined based on the characteristics of the object (color spectrum, brightness, shape, motion or lack of motion, etc.). In this example, the likelihood may be defined as equal to probability of an observed outcome (the object represents a road flare) given those parameter values. Those skilled in the art will appreciate that determining the likelihood function may involve distinguishing between discrete probability distribution, continuous probability distribution, and mixed continuous-discrete distributions, and that several types of likelihood exist such as log likelihood, relative likelihood, conditional likelihood, marginal likelihood, profile likelihood, and partial likelihood.

In still another example, the computing device may be configured to process the characteristics of the object through a classifier to determine the likelihood. The classifier can be defined as an algorithm or mathematical function implemented by a classification algorithm that maps input information (e.g., the characteristics of the object) to a class (e.g., the object represents a road flare).

Classification may involve identifying to which of a set of classes (e.g., the object represents or does not represent a road flare) a new observation may belong, on the basis of a training set of data containing observations (or instances) with a known class. The individual observations may be analyzed into a set of quantifiable properties, known as various explanatory variables or features. As an example, classification may include assigning a respective likelihood to "object represents a road flare" or "object does not represent a road flare" classes as indicated by respective determined characteristics of a respective object (e.g., color spectrum, shape, brightness, motion or lack of motion, etc.).

In one example, the classification may include a probabilistic classification. Probabilistic classification algorithms may output a probability of an instance (e.g., a driving situation or a group of observations indicated by determined characteristics of respective object) being a member of each of the possible classes: "object represents a road flare" or "object does not represent a road flare". Determining likelihood that the respective object represents a road flare may be based on probability assigned to each class. Also, the probabilistic classification can output a confidence value associated with determining that the respective object represents a road flare.

Example classification algorithms may include Linear classifiers (e.g., Fisher's linear discriminant, logistic regression, naive Bayes, and perceptron), Support vector machines (e.g., least squares support vector machines), quadratic classifiers, kernel estimation (e.g., k-nearest neighbor), boosting, decision trees (e.g., random forests), neural networks, Gene Expression Programming, Bayesian networks, hidden Markov models, and learning vector quantization. Other example classifiers are also possible.

As an example for illustration, a linear classifier may be expressed as a linear function that assigns a score or likelihood to each possible class k (e.g., "object represents a road flare" or "object does not represent a road flare") by combining a feature vector (vector of parameters associated with the characteristics of the object) of an instance (e.g., a driving situation) with a vector of weights, using a dot product. Class with the higher score or likelihood may be selected as a predicted class. This type of score function is known as a linear predictor function and may have this general form:

$$\text{Score}(X_i, k) = \beta_k \cdot X_i \quad [4]$$

where $X_i$ is the feature vector for instance i, $\beta_k$ is a vector of weights corresponding to category k, and score($X_i$, k) is the score associated with assigning instance i to category k.

As an example, a training computing device may be configured to receive training data for a plurality of driving situations of a given vehicle. For example, for each of the plurality of driving situations, respective training data may include respective determined characteristics of a respective object. Also, the training computing device may be configured to receive positive or negative indication that the respective object represents a road flare corresponding to the respective training data for each of the driving situations. Further the training computing device may be configured to correlate, for each driving situation, the positive or negative indication with the respective training data; and determine parameters (e.g., vector of weights for equation 4) of the classifier based on the correlations for the plurality of driving situations. These parameters may be provided to the computing device of the vehicle such that as the computing device determines characteristics of an object, the computing device may process the characteristics through the classifier using the determined parameters of the classifier to determine the likelihood that the object represents a road flare.

In one example, the likelihood may be qualitative such as "low," "medium," or "high" or may be numerical such as a number on a scale, for example. Other examples are possible. Referring to FIG. 4, the computing device may be configured to determine the likelihood that the bright object 412 represents a road flare using any of the techniques described above.

At block 310, the method 300 includes modifying, using the computing device, a control strategy associated with a driving behavior of the vehicle based on the likelihood. The computing device may be configured to identify the given pixels and determining the likelihood in real-time while the vehicle is travelling on the road. The control system of the vehicle may support multiple control strategies and associated driving behaviors that may be predetermined or adaptive to changes in a driving environment of the vehicle. Generally, a control strategy may comprise sets of rules associated with traffic interaction in various driving contexts such as approaching a hazard condition. The control strategy may comprise rules that determine a speed of the vehicle and a lane that the vehicle may travel on while taking into account safety and traffic rules and concerns (e.g., road traffic changes due to existence of a hazard condition, vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, in approaching a hazard condition indicated by a road flare, the computing device may be configured to modify or select, based on the determined likelihood that a detected object represents the road flare, a control strategy comprising rules for actions that control the vehicle speed to safely maintain a distance with other objects and select a lane that is considered safest given road traffic changes due to the hazard condition.

As an example, referring to FIG. 4, if the likelihood that the bright object 412 represents a road flare is high (e.g., exceeds a predetermined threshold), the computing device may be configured to utilize sensor information, received from on-board sensors on the vehicle 402 or off-board sensors in communication with the computing device, in making a navigation decision rather than preexisting map information that may not include information and changes relating to the hazard condition. Also, the computing device may be configured to utilize the sensor information rather than the preexisting map information to estimate lane boundaries. For example, in FIG. 4, the computing device may be configured to determine locations of hazard condition markers (e.g., cone(s) 416) rather than lane markers 414 on the road 404 to estimate and follow the lane boundaries. As another example, the computing device may be configured to activate one or more sensors for detection of humans 418 and making the navigation decision based on the detection.

In an example, a first control strategy may comprise a default driving behavior and a second control strategy may comprise a defensive driving behavior. Characteristics of a the defensive driving behavior may comprise, for example, following another vehicle, such as vehicle 420, maintaining a predetermined safe distance with the vehicle 420 that may be larger than a distance maintained in the default driving behavior, turning-on lights, reducing a speed of the vehicle 402, and stopping the vehicle 402. In this example, the computing device of the vehicle 402 may be configured to compare the determined likelihood to a threshold likelihood, and the computing device may be configured to select the first or the second control strategy, based on the comparison. For instance, if the determined likelihood is greater than the threshold likelihood, the computing device may be configured to select the second driving behavior (e.g., the defensive driving behavior). If the determined likelihood is less than the threshold likelihood, the computing device may be configured to modify the control strategy to the first control strategy (e.g., select the default driving behavior).

In yet another example, alternatively or in addition to transition between discrete control strategies (e.g., the first control strategy and the second control strategy) the computing device may be configured to select from a continuum of driving modes or states based on the determined likelihood. In still another example, the computing device may be configured to select a discrete control strategy and also may be configured to select a driving mode from a continuum of driving modes within the selected discrete control strategy. In this example, a given control strategy may comprise multiple sets of driving rules, where a set of driving rules describe actions for control of speed and direction of the vehicle 402. The computing device further may be configured to cause a smooth transition from a given set of driving rules to another set of driving rules of the multiple sets of driving rules, based on the determined likelihood. A smooth transition may indicate that the transition from the given set of rules to another may not be perceived by a passenger in the vehicle 402 as a sudden or jerky change in a speed or direction of the vehicle 402, for example.

In an example, a given control strategy may comprise a program or computer instructions that characterize actuators controlling the vehicle 402 (e.g., throttle, steering gear, brake, accelerator, or transmission shifter) based on the determined likelihood. The given control strategy may include action sets ranked by priority, and the action sets may include alternative actions that the vehicle 402 may take to accomplish a task (e.g., driving from one location to another). The alternative actions may be ranked based on the determined likelihood, for example. Also, the computing device may be configured to select an action to be performed and, optionally, modified based on the determined likelihood.

In another example, multiple control strategies (e.g., programs) may continuously propose actions to the computing device. The computing device may be configured to decide which strategy may be selected or may be configured to modify the control strategy based on a weighted set of goals (safety, speed, etc.), for example. Weights of the weighted set of goals may be a function of the determined likelihood. Based on an evaluation of the weighted set of goals, the computing device, for example, may be configured to rank the multiple control strategies and respective action sets and select or modify a given strategy and a respective action set based on the ranking.

These examples and driving situations are for illustration only. Other examples and control strategies and driving behaviors are possible as well.

Referring back to FIG. 3, at block 312, the method 300 includes providing, using the computing device, instruction to control the vehicle based on the modified control strategy. In an example, the computing device may be configured to control actuators of the vehicle using an action set or rule set associated with the modified control strategy. For instance, the computing device may be configured to adjust translational velocity, or rotational velocity, or both, of the vehicle based on the modified driving behavior.

As an example, in FIG. 4, providing instructions to control the vehicle 402 may comprise determining a desired path of the vehicle, based on the likelihood. The computing device may have determined a high likelihood that the bright object 412 represents a road flare on the road 404 on which the vehicle 402 is travelling. The computing device may be configured to take into account lane boundary indicated by the lane markers 414 on the road 404 as a soft constraint (i.e., the lane boundary can be violated if a safer path is determined) when determining the desired path. The computing device thus may be configured to determine a number and locations of the cone(s) 416 that may form a modified lane boundary; and may be configured to adhere to the modified lane boundary instead of the lane boundary indicated by the lane markers 414.

As shown in FIG. 4, the vehicle 402 may be approaching an accident site indicated by a road flare (i.e., the bright object 412) on the road 404, and the computing device may be configured to control the vehicle 402 according to a defensive driving behavior to safely navigate the accident site. For example, the computing device may be configured to reduce speed of the vehicle 402, cause the vehicle 402 to change lanes and adhere to the modified lane boundary formed by the cone(s) 416, shift to a position behind the vehicle 420, and follow the vehicle 420 while keeping a predetermined safe distance.

These control actions and driving situations are for illustration only. Other actions and situations are possible as well. In one example, the computing device may be configured to control the vehicle based on the modified control strategy as an interim control until a human driver can take control of the vehicle.

In some embodiments, the disclosed methods may be implemented as computer program instructions encoded on a computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein. In one embodiment, the example computer program product 700 is provided using a signal bearing medium 701. The signal bearing medium 701 may include one or more program instructions 702 that, when executed by one or more processors may provide functionality or portions of the functionality described above with respect to FIGS. 1-6D. Thus, for example, referring to the embodiments shown in FIG. 3, one or more features of blocks 302-312 may be undertaken by one or more instructions associated with the signal bearing medium 701. In addition, the program instructions 702 in FIG. 7 describe example instructions as well.

In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 701 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming to the IEEE 802.11 standard or other transmission protocol).

The one or more programming instructions 702 may be, for example, computer executable and/or logic implemented instructions. In some examples, a computing device such as the computing device described with respect to FIGS. 1-6D may be configured to provide various operations, functions, or actions in response to the programming instructions 702 conveyed to the computing device by one or more of the computer readable medium 703, the computer recordable medium 704, and/or the communications medium 705. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, at a computing device of a vehicle, an image of an environment of the vehicle, wherein the image includes a plurality of pixels having respective red color values, green color values, and blue color values;
   identifying given pixels in the plurality of pixels having one or more of: (i) a red color value greater than a green color value, and (ii) the red color value greater than a blue color value;
   making a comparison between one or more characteristics of a shape of an object represented by the given pixels in the image and corresponding one or more characteristics of a predetermined shape of a road flare;
   determining one or more motion characteristics of the object represented by the given pixels;
   determining, using the computing device, a likelihood that the object represents the road flare based at least on (i) the comparison, and (ii) the one or more motion characteristics of the object, such that the likelihood is increased when the one or more motion characteristics indicate that the object remains stationary;
   modifying, using the computing device, a control strategy associated with a driving behavior of the vehicle, based on the likelihood; and
   providing, using the computing device, instructions to control the vehicle based on the modified control strategy.

2. The method of claim 1, wherein the computing device is configured to control the vehicle in an autonomous operation mode.

3. The method of claim 1, wherein identifying the given pixels comprises:
   converting the image into a monochrome space image, wherein in the monochrome space image:
      any pixel having a difference between a red color value and a green color value less than zero, or a difference between the red color value and a blue color value less than zero, is assigned a zero intensity value, and
      remaining pixels are assigned an intensity value equal to a maximum of the difference between the red color value and the green color, or the difference between the red color value and the blue color.

4. The method of claim 1, identifying the given pixels comprises:
   making a comparison of the red color value of the given pixels to a predetermined red color value threshold,
   wherein determining the likelihood comprises determining the likelihood further based on an output of the comparison of the red color value of the given pixels to the predetermined red color value threshold.

5. The method of claim 1, wherein making the comparison between the one or more characteristics of the shape of the object represented by the given pixels and the corresponding one or more characteristics of the predetermined shape of the road flare comprises:
   applying a predetermined shape template, associated with the road flare, to the object to determine whether one or more pixels surrounding the object have respective color values different from predetermined color values of the road flare.

6. The method of claim 1, further comprising:
   determining a first likelihood that the object represents the road flare based on the red color value of the given pixels; and
   determining a second likelihood that the object represents the road flare based on an output of the comparison between the one or more characteristics of the shape of the object and the corresponding one or more characteristics of the predetermined shape of the road flare,
   wherein determining the likelihood that the object represents the road flare is based on a combination of the first likelihood and the second likelihood.

7. The method of claim 6, further comprising:
   determining a third likelihood that the object represents the road flare based on one or more motion characteristics of the object,
   wherein determining the likelihood comprises determining the likelihood based on a combination of the first likelihood, the second likelihood, and the third likelihood.

8. The method of claim 1, further comprising:
   detecting, using the computing device, based on the road flare, a hazard condition in the environment of the vehicle, wherein modifying the control strategy is based on the detected hazard condition.

9. The method of claim 1, wherein providing instructions to control the vehicle comprises providing instructions for one or more of: (i) utilizing sensor information received from on-board or off-board sensors in making a navigation decision rather than preexisting map information, (ii) utilizing the sensor information to estimate lane boundaries rather than the preexisting map information, (iii) determining locations of hazard condition markers rather than lane markers on a road to estimate and follow the lane boundaries, (iv) activating one or more sensors for detection of humans and making the navigation decision based on the detection, (v) following another vehicle, (vi) maintaining a predetermined safe distance with other vehicles, (vii) turning-on lights, and (viii) reducing a speed of the vehicle.

10. A non-transitory computer readable medium having stored thereon instructions that, when executed by a computing device of a vehicle, cause the computing device to perform functions comprising:

receiving an image of an environment of the vehicle, wherein the image includes a plurality of pixels having respective red color values, green color values, and blue color values;

identifying given pixels in the plurality of pixels having one or more of: (i) a red color value greater than a green color value, and (ii) the red color value greater than a blue color value;

making a comparison between one or more characteristics of a shape of an object represented by the given pixels in the image and corresponding one or more characteristics of a predetermined shape of a road flare;

determining one or more motion characteristics of the object represented by the given pixels;

determining a likelihood that the object represents the road flare based at least on (i) the comparison, and (ii) the one or more motion characteristics of the object, such that the likelihood is increased when the one or more motion characteristics indicate that the object remains stationary;

modifying a control strategy associated with a driving behavior of the vehicle, based on the likelihood; and providing instructions to control the vehicle based on the modified control strategy.

11. The non-transitory computer readable medium of claim 10, wherein the function of identifying the given pixels comprises:

assigning to any pixel having a difference between a red color value and a green color value less than zero, or a difference between the red color value and a blue color value less than zero, a zero intensity value; and assigning to remaining pixels an intensity value equal to a maximum of the difference between the red color value and the green color, or the difference between the red color value and the blue color.

12. The non-transitory computer readable medium of claim 10, wherein the function of making the comparison between the one or more characteristics of the shape of the object represented by the given pixels and the corresponding one or more characteristics of the predetermined shape of the road flare comprises:

applying a predetermined shape template, associated with the road flare, to the object to determine whether one or more pixels surrounding the object have respective color values different from predetermined color values of the road flare.

13. The non-transitory computer readable medium of claim 10, wherein the function of providing instructions to control comprises providing instruction for one or more of: (i) utilizing sensor information received from on-board or off-board sensors in making a navigation decision rather than preexisting map information, (ii) utilizing the sensor information to estimate lane boundaries rather than the preexisting map information, (iii) determining locations of hazard condition markers rather than lane markers on a road to estimate and follow the lane boundaries, (iv) activating one or more sensors for detection of humans and making the navigation decision based on the detection, (v) following another vehicle, (vi) maintaining a predetermined safe distance with other vehicles, (vii) turning-on lights, and (viii) reducing a speed of the vehicle.

14. A system, comprising:

at least one processor; and data storage comprising instructions that, when executed by the at least one processor, cause the system to perform functions comprising:

receiving an image of an environment of a vehicle, wherein the image includes a plurality of pixels having respective red color values, green color values, and blue color values;

identifying given pixels in the plurality of pixels having one or more of: (i) a red color value greater than a green color value, and (ii) the red color value greater than a blue color value;

making a comparison between one or more characteristics of a shape of an object represented by the given pixels in the image and corresponding one or more characteristics of a predetermined shape of a road flare;

determining one or more motion characteristics of the object represented by the given pixels;

determining a likelihood that the object represents the road flare based at least on (i) the comparison, and (ii) the one or more motion characteristics of the object, such that the likelihood is increased when the one or more motion characteristics indicate that the object remains stationary;

modifying a control strategy associated with a driving behavior of the vehicle, based on the likelihood; and providing instructions to control the vehicle based on the modified control strategy.

15. The system of claim 14, wherein the functions further comprise:

determining a first likelihood that the object represents the road flare based on the red color value of the given pixels; and determining a second likelihood that the object represents the road flare based on an output of the comparison between the one or more characteristics of the shape of the object and the corresponding one or more characteristics of the predetermined shape of the road flare, wherein determining the likelihood that the object represents the road flare is based on a combination of the first likelihood and the second likelihood.

16. The system of claim 15, wherein the functions further comprise:

determining a third likelihood that the object represents the road flare based on one or more motion characteristics of the object, wherein determining the likelihood comprises determining the likelihood based on a combination of the first likelihood, the second likelihood, and the third likelihood.

17. The system of claim 14, wherein the function of determining the likelihood comprises determining the likelihood in real-time.

* * * * *